United States Patent
Lin

(10) Patent No.: US 7,260,046 B2
(45) Date of Patent: Aug. 21, 2007

(54) CLAMPER GUIDER IN SLOT-IN DRIVE

(75) Inventor: Hung-Jui Lin, Taipei (TW)

(73) Assignee: EPO Science & Technology Inc., Taipei (TW)

( * ) Notice: Subject to any disclaimer, the term of this patent is extended or adjusted under 35 U.S.C. 154(b) by 455 days.

(21) Appl. No.: 10/860,228

(22) Filed: Jun. 4, 2004

(65) Prior Publication Data

US 2005/0270952 A1 Dec. 8, 2005

(51) Int. Cl.
*G11B 33/02* (2006.01)

(52) U.S. Cl. .................... 369/75.11; 369/75.21

(58) Field of Classification Search .......... 369/75.11, 369/75.21, 77.11, 30.95, 270.1, 271.1, 258.1, 369/292; 720/604, 605, 611, 619, 692, 706, 720/707, 716, 723

See application file for complete search history.

(56) References Cited

U.S. PATENT DOCUMENTS 5,748,606 A * 5/1998 Nakagawa et al. ......... 720/710

| 6,275,465 B1* | 8/2001 | Shirashima et al. | 720/713 |
| 6,928,045 B2* | 8/2005 | Eum et al. | 369/270.1 |
| 6,954,935 B2* | 10/2005 | Niikura et al. | 720/604 |
| 2005/0015788 A1* | 1/2005 | Morikawa | 720/619 |

* cited by examiner

*Primary Examiner*—Wayne Young
*Assistant Examiner*—Abdukader Muhammed
(74) *Attorney, Agent, or Firm*—Troxell Law Office, PLLC

(57) ABSTRACT

A clamper guider in a slot-in drive comprises a sheet body, a lower section at the lower side of the sheet body is disposed at the front end of the sheet body; a rear section pivotally connected to a ceiling plate of a chassis is disposed at the rear end of the sheet body; an arm is extended at the flank side of the sheet body, the flank side of the arm is connected to the ceiling plate of the chassis; a round hole combined with said clamper is disposed at the lower section. Whereby, the clamper guider has a smaller volume and the matching design of each component in the whole chassis is more convenient. And, a shorter pivoting end is disposed between the clamper guider and the ceiling plate of the chassis and the end that the clamper guider is combined with the clamper is more stable rather not to yield a shaking in the level direction.

6 Claims, 3 Drawing Sheets

CLAMPER GUIDER IN SLOT-IN DRIVE

Patent applications Ser. Nos. 10/860,000 and 10/860,143 are related applications filed concurrently with this application.

FIELD OF THE INVENTION

The present invention relates to a clamper guider in a slot-in drive, and more particularly to a clamper guider combined with a clamper for allowing a clamper to move up and down steadily.

DESCRIPTION OF RELATED ART

A general slot-in drive has a thinner outlook structure, and is easier for a user to insert and take out a disc; and is often assembled in a car stereo module to use for playing a disc.

Taiwan patent No. 555,131 "Structure of a slot-in drive" discloses a slot-in drive, comprising a disc clamping plate and a clamping tray connected thereto. By using a clamping tray and a disc loading tray to clamp a disc respectively from the upper and lower sides thereof and rotating the disc for an optical read/write head to read data stored in the disc; shafts are disposed at the two sides of the rear end of the disc clamping plate; the shafts are pivotally connected to the pivoting holes ear sheets above the two sides at the upper end of a chassis. A transmission mechanism controls the front end of the clamping plate to bend or lift so as to clamp or release the disc. A supporting piece in the transmission mechanism is propped against the lower end of propped arm at the flank side of the clamping plate to allow a space to be existed between the clamping tray and the loading tray for passing the disc through. When the disc is positioned, the transmission mechanism drives the supporting piece to move in a beeline simultaneously to be separated from the lower end of the propped arm to allow the clamping tray with magnetic force to clamp the disc with the loading tray.

The width of the disc clamping plate according to the Taiwan patent mentioned above is approximately same as the one of the chassis and the pivoting ends that it is connected with the chassis is positioned at the two ends of the chassis so that the clamping plate occupies spaces. If the width of the disc clamping plate and the width of the pivoting end are shortened, although the spaces occupied by the disc clamping plate can be shrunk, but one end that the disc clamping plate is combined with the clamping tray is relatively unstable. When the whole chassis is shaken or the clamping tray is moved downward, the end that the clamping plate is combined with the clamping tray is easily shaken rightward and leftward at a level direction so that the disc is unstably read or the clamping tray is deviated from the position that the disc is clamped.

SUMMARY OF THE INVENTION

The main object of the present invention is to provide a clamper guider in a slot-in drive, allowing the clamper guider and a ceiling plate of a chassis to have a shorter pivoting end and one end of the clamper guider combined with the clamper is more stable and rather not being yield a shaking in a level direction, enabling the clamper to combine a disc stably and rather not causing a round guiding hole to contact with a neck portion of the clamper to yield noise and lower the rotating speed of the disc to cause the disc to be read unstable owing to the shaking of the chassis while an optical read/write head reading the disk.

Another object of the present invention is to provide a clamper guider in a slot-in drive, enabling the clamper guider to have a smaller volume in a limited space to be convenient for the matching design of each component in a whole chassis.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
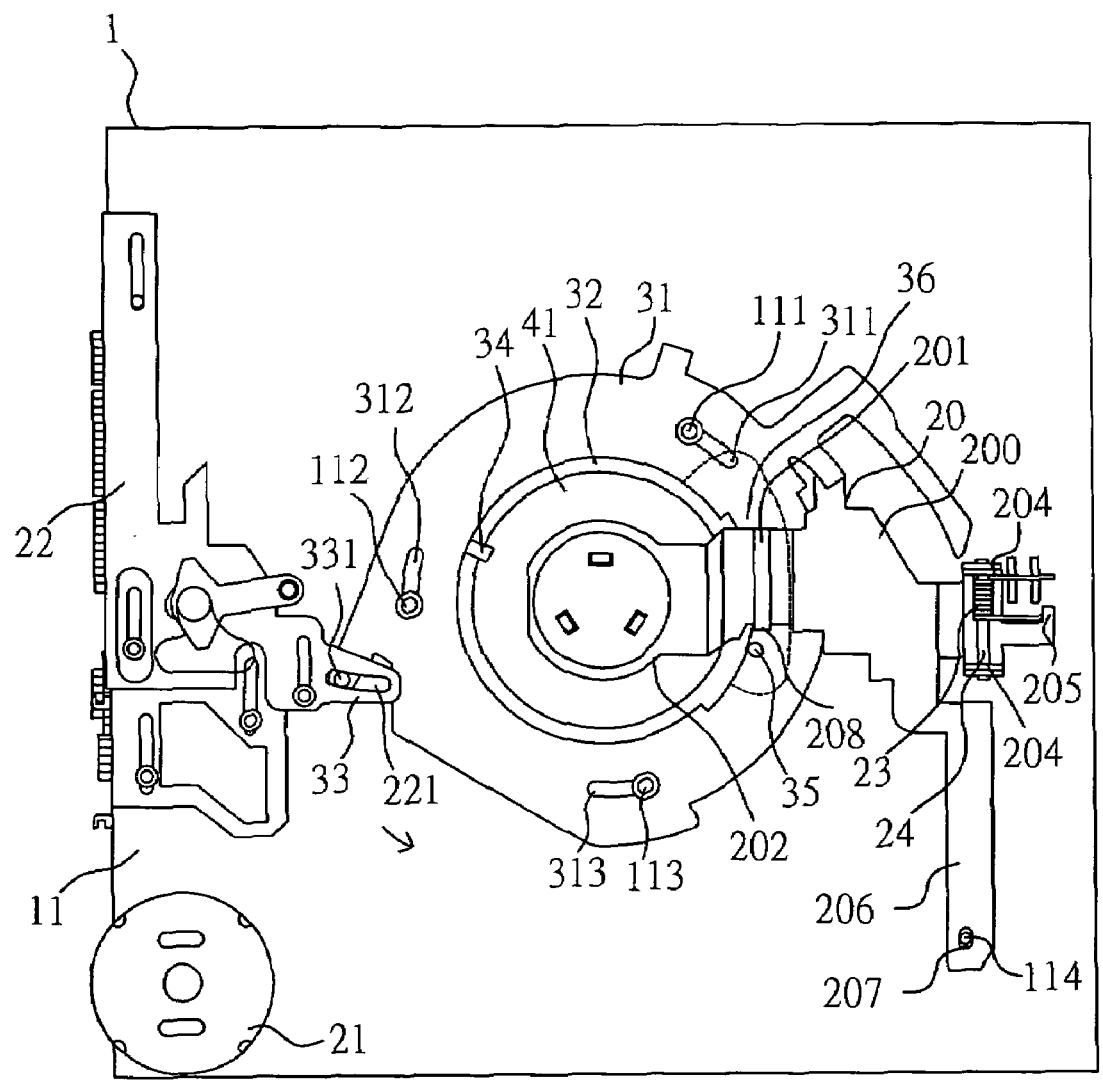
FIG. 1 is a plane schematic view, showing that a clamper guider is connected to a ceiling plate of a chassis according to the present invention.

Please refer to FIG. 1. A clamper guider 20 is combined with a chassis 1 of a slot-in drive and propped by a control sheet 31 to drive the clamper 41 to move up and down. The chassis 1 is further connected to a motor 21 and transmission mechanism 22.

Figure 2:
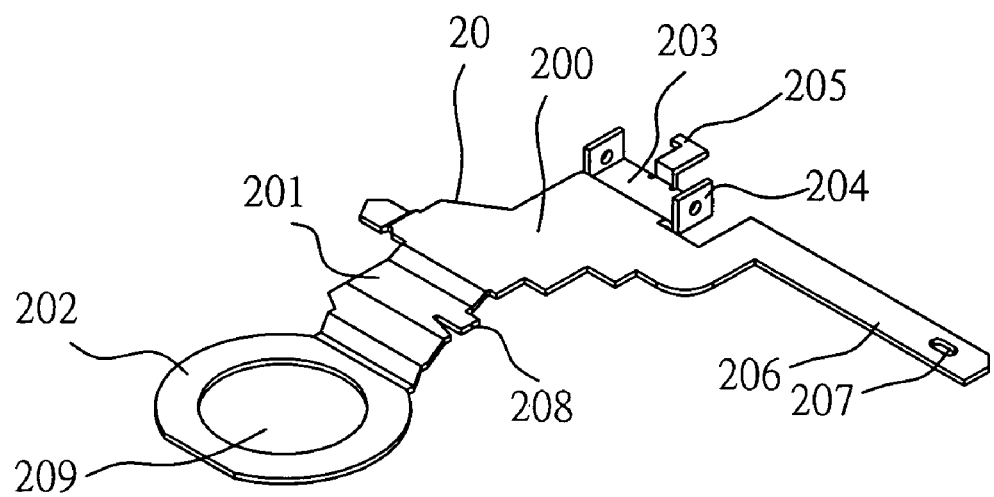
FIG. 2 is a prospective view, showing a clamber guider according to the present invention.

Please refer to FIG. 2. The damper guider 20 comprises a sheet body 200; a bended downward section 201 is disposed at the front end of the sheet body 200, which is allowed to position below the same plane as the sheet body 200. A lower section 202 is bent downward at the front end of the bended downward section 201 and a rear section 203 is bent downward at the rear end of the sheet body 200. Two ear sheets 204 each with a pivoting hole are projected upward at the two flank sides of the rear section 203 and a buckling ear 205 is projected upward at the rear end of the rear section 203. An arm 206 is extended at the flank side of the sheet body 200 and a slot hole 207 is disposed at the flank side of the arm 206. An upward bended sheet 208 is protruded out at the flank side of the bended downward section 201. A round hole 209 is disposed in the lower section 202.

Please refer to FIG. 1. Guide pins 114, 111, 112 and 113 are passed respectively through guide slots 207, 311, 312 and 313 in the damper guider 20 and the control sheet 31 from above a ceiling plate 11 of the chassis 1 relatively to the corresponding slots. The upper end of each guide pin is connected with C-ring outside of each slot. An arm 33 is extended at the one flank side of the control sheet 31. The arm 33 is combined with a guide pin 331. A guide slot 221 used to accept the guide pin 331 is disposed in the transmission mechanism 22. The three slots 311, 312 and 313 in the control sheet 31 are arranged symmetrically at a same circumference. Please refer to FIG. 3, hole 32 is respectively disposed at position that the ceiling plate 11 and the control sheet 31 are relative to the damper 41 for allowing the damper 41 to move into the lower side of the ceiling plate 11 to cause the attraction between the magnetic attraction portions of the damper 41 and the disc driving unit. A retaining sheet 34 is extended upward from the ceiling plate 11; one end of the retaining sheet 34 is stretched into the hole 32.

Figure 3:
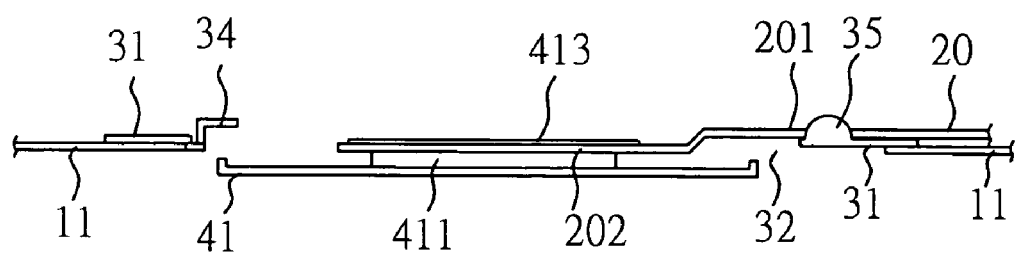
FIG. 3 is a part of side view, showing that a clamper guider combined with a ceiling base of a chassis according to the present invention.
Figure 4:
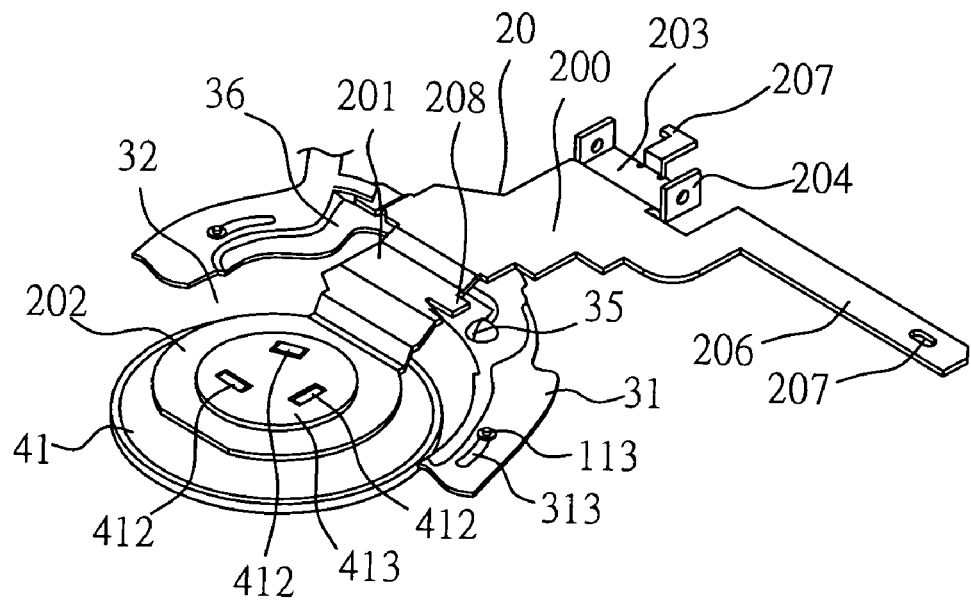
FIG. 4 is a partly prospective view, showing that a clamper guider combined with a ceiling base of a chassis according to the present invention.

Please refer to FIGS. 1, 3 and 4. A raised piece 35 projected upward is disposed at the flank side of the control sheet 31 relative to the damper guider 20; a slant face is formed at the side of the raised piece 35 faced to the clamber guider 20. A groove 36 bended downward is disposed at a location on the control sheet 31 relative to a bended downward section 201 of the clamber guider 20 to allow the lower section 202 of the clamber guider 20 connected with the damper 41 to be stretched into the lower side of the hole 32. A hollow space, relative to the moving area of the groove 36, is existed at the ceiling plate 11 for not blocking the moving of the groove 36. Three bayonets 412 of a neck portion 411 projected upward in the middle of the damper 41 are passed through the round hole of the low section 202 to buckle respectively in the corresponding buckling holes in a buckling sheet 413 for connecting the neck portion 411 of the clamper 41 pivotally in the round hole so that the clamper 41 can be rotated freely. Two ear sheets are also extended upward on the ceiling plate 11 relative to two ear sheets 204; all of the ear sheets have holes to be connected pivotally to an axis 24. A torsion spring 23 is combined with the axis 24. The two ends of torsion spring 23 are respectively disposed between the ceiling plate 11 and buckling ears 205 of the rear section 203 to provide a force pressing the lower section 202 downward.

Figure 5:
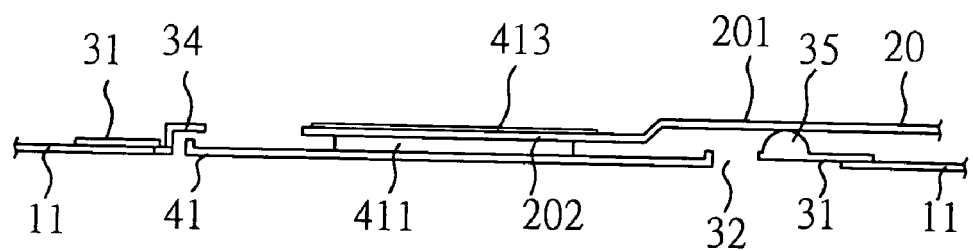
FIG. 5 is a part of side view, showing that a clamper is driven upward by a clamper guider according to the present invention.

When the motor 21 rotates toward one direction, the guide pin 331 is driven to move through the guide hole 221 of the transmission mechanism 22 to allow the three slots 311, 312 and 313 in the control sheet 31 to take respectively the guide pins 111, 112 and 113 as fulcrums to rotate counterclockwise. The lower end of the bended downward section 201 of the clamber guider 2 is further propped against by the raised piece 35 to cause the lower section 202 and the clamper 41 to be elevated (as FIG. 5 shows) to separate the clamper 41 from the location that the disc is clamped thereby. An upward bended sheet 208 is projected out at the location that the bended downward section 201 is contacted with the raised piece 35 to allow the raised piece 35 to prop against the lower side of the upward bended sheet 208 more smoothly.

When the motor 21 rotates toward another direction, the control sheet 31 is rotated clockwise to cause the raised piece 35 to be retreated from the lower side of the bended downward section 201 of the clamber guider 20. The lower section 202 is caused to move downward through the elastic force yielded from the torsion spring 24 to allow the clamper 41 to enter the lower side of the hole 32 so as to be attracted with the magnetic attraction portion of the disc driving unit to clamp the disc.

The clamper guider 20 according to the present invention has a smaller volume; it is convenient for the matching design of each component in the whole chassis in a limited space.

The designs such as that bended downward section 201 of the clamper guider 20 is operated in coordination with the groove 36 of the control sheet 31, a hollow area exists in the moving area of the ceiling plate 11 relative to the groove 36 and the moving of the groove 36 is not blocked can allow the lower section 202 of the clamper guider 20 to be moved down deeper and the upper end of the clamper guider 20 to be moved up less to reduce the height that the upper end of the clamper guider 20 is projected out of the ceiling plate 11 while moving so that the height of the slot-in drive can be reduced.

The designs of the side arm 206 and the limitation of the side moving of the side arm 206 according to the present invention are contributive to the reduction of the shaking in level direction yielded when the lower section 202 of the clamper guider 20 is moved downward to allow the clamper 41 to move down more stably and accurately to clamp the disc. And, when the whole chassis 1 is shaken, the shaking of the lower section 202 in level direction can be reduced to allow the neck portion 411 of the clamper piece 41 rather not to touch the round hole of the lower section 202 to yield noise and even to lower the rotating speed of the disc to cause the disc to be read less stably.

It is noted that the clamper guider in a slot-in drive described above is the preferred embodiment of the present invention for the purpose of illustration only, and are not intended as a definition of the limits and scope of the invention disclosed. Any modifications and variations that may be apparent to a person skilled in the art are intended to be included within the scope of the present invention.

What is claimed is:

1. A clamper guider in a slot-in drive, combined with a chassis in the slot-in drive, and is controlled by a control sheet for driving a clamper to move up and down, comprising: a sheet body, a lower section at a lower side of said sheet body being disposed at a front end of said sheet body; a rear section pivotally connected to a ceiling plate of said chassis being disposed at a rear end of said sheet body; an arm being extended at a flank side of said sheet body, a flank side of said arm being connected to said ceiling plate of said chassis; a round hole combined with said clamper being disposed at said lower section, wherein a bended downward section is disposed between said sheet body and said lower section, said bended downward section is disposed below said sheet body but beyond said lower section.

2. The clamper guider according to claim 1, wherein said rear section is disposed below said sheet body.

3. The clamper guider according to claim 1, wherein two ear sheets each with a pivoting hole are extended upward at two flank sides of said rear section.

4. The clamper guider according to claim 1, wherein an upward bended sheet is protruded out at a flank side of said bended downward section relative to a raised piece of said control sheet.

5. The clamper guider according to claim 3, wherein said pivoting holes of said two ear sheets are respectively corresponded to pivoting holes of two ear sheets of said ceiling plate; two ends of a bar are respectively pivotally connected to said pivoting holes.

6. A clamper guider in a slot-in drive, combined with a chassis in the slot-in drive, and is controlled by a control sheet for driving a clamper to move up and down, comprising a sheet body, a lower section at a lower side of said sheet body being disposed at a front end of said sheet body; a rear section pivotally connected to a ceiling plate of said chassis being disposed at a rear end of said sheet body; an arm being extended at a flank side of said sheet body, a flank side of said arm being connected to said ceiling plate of said chassis; a round hole combined with said clamper being disposed at said lower section, wherein two ear sheets each with a pivoting hole are extended upward at two flank sides of said rear section, wherein said pivoting holes of said two ear sheets are respectively corresponded to pivoting holes of two ear sheets of said ceiling plate; two ends of a bar are respectively pivotally connected to said pivoting holes, where in a buckling ear is projected upward at a rear end of said rear section; said bar is connected to a torsion spring, two ends of said torsion spring are respectively installed between said ceiling plate and said buckling ear; whereby, a force pressing said lower section downward is provided.

* * * * *